United States Patent [19]

Schoonheere et al.

[11] Patent Number: 4,962,632
[45] Date of Patent: Oct. 16, 1990

[54] AGRICULTURAL BALER WITH MOVABLE FEEDER FLOOR

[75] Inventors: Marnix J. Schoonheere, Ichtegem; Roger H. Van Eecke, Blankenberge, both of Belgium

[73] Assignee: Ford New Holland, Inc., New Holland, Pa.

[21] Appl. No.: 343,460

[22] Filed: Apr. 25, 1989

[30] Foreign Application Priority Data

Apr. 28, 1988 [GB] United Kingdom ........... 8810061

[51] Int. Cl.⁵ .................................................. A01D 39/00
[52] U.S. Cl. ........................................... 56/341; 100/142; 100/189
[58] Field of Search ............ 100/189, 142, 179, 188 R, 100/190, 7, 45; 56/341, 344; 198/611, 638, 642, 518, 519

[56] References Cited

U.S. PATENT DOCUMENTS

| | | | |
|---|---|---|---|
| 661,349 | 11/1900 | Mallett | 100/189 X |
| 2,381,620 | 8/1945 | Russell | 100/189 X |
| 2,552,888 | 5/1951 | Druetta | 100/189 |
| 4,457,422 | 7/1984 | Hurd | 198/611 X |
| 4,525,991 | 7/1985 | Naaktgeboren | 100/189 X |
| 4,597,491 | 7/1986 | Conklin | 198/642 |

FOREIGN PATENT DOCUMENTS

| | | | |
|---|---|---|---|
| 123062 | 5/1931 | Australia | 100/142 |
| 1220658 | 7/1966 | Fed. Rep. of Germany | 56/344 |
| 7807102 | 1/1980 | Netherlands . | |
| 2059869 | 6/1983 | United Kingdom . | |

Primary Examiner—Philip R. Coe
Assistant Examiner—Stephen F. Gerrity
Attorney, Agent, or Firm—Darrell F. Marquette; Frank A. Seemar; Larry W. Miller

[57] ABSTRACT

The agricultural baler operable to produce square bales and comprising a bale case having an inlet opening formed therein, a feeder communicating at one end with the inlet opening in the bale case and feeder tines operable to feed crop material into the feeder duct to form a wad of crop material for subsequent transfer to the bale case. A wall of the feeder duct is provided with rollers or a conveyor operable to assist in the movement of crop material within the feeder duct and contactable by the crop material as it passes through the feeder duct, whereby the frictional forces produced by the passage of the crop material over that wall of the feeder duct are reduced.

7 Claims, 6 Drawing Sheets

AGRICULTURAL BALER WITH MOVABLE FEEDER FLOOR

BACKGROUND OF THE INVENTION

This invention relates to agricultural balers for producing the so-called square or rectangular type of bale, as opposed to the cylindrical or round bale. More specifically, the invention relates to such balers which produce relatively large square bales and are constructed differently from the balers producing smaller square bales.

The principle difference between the small and large square balers is that in the former, the bale case in which a bale is actually formed has wads of crop material delivered to it from a feeder duct positioned to one side of the bale case, whereas in the latter, the feeder duct is located beneath the bale case, whereby the latter is bottom fed. Furthermore, the cross-sectional area of the bale case of the large baler is considerably greater than that for the small baler, whereby the wad of crop material periodically fed to the bale case is correspondingly larger. It is desirable to provide a relatively compact wad of crop material in the feeder duct in order to ensure a relatively constant density of the bale being formed but in the case of a large baler with the greater amount of crop material involved, this can give rise to plugging of the feeder duct when, for example, normally dry crop is damp when being baled, or naturally moist crop, such as silage, is being baled.

Traditionally, silage has been stored in silos but this requires the use of a forage harvester in order to pick up crop material and chop it into small pieces. Normally a trailer moves alongside the forage harvester and into which crop material is blown by the machine. The trailer then transports the crop material from the field to the place of storage. If a tower silo is employed, then a blower is required to transfer the silage from the trailer to the tower. Farmers are looking increasingly to the use of a baler for operating on silage because the machine is normally available to him as it is required to bale other crops and the handling and storage of bales of crop material is that much more convenient. On the other hand if any specialised equipment is required in this respect, then again it is normally available to the farmer as he will be using it to handle bales of other crop material.

The use of a baler for baling silage means that there is an increased risk of the feeder duct to the bale case becoming plugged. The general problem of plugging has been addressed in the past and steps taken to reduce the likelihood thereof, such as by the use of expandable feeder ducts as disclosed in U.S. Pat. No. 2,552,888, British Patent No. 2,059,869 and Dutch Patent No. 7807102, for example. However, these measures cannot be guaranteed to prevent plugging of the bale case feeder duct and when plugging occurs, it is extremely difficult, and hence time consuming, to remove the plug of crop material. This is because ready access to the feeder duct cannot be gained (even if the pick-up device is removed) and even if it could, it is not an easy task manually to pull the plug of crop material from the feeder duct because the plug is very tightly wedged in the duct and the crop feeder mechanism present in the duct aggravates the problem. Indeed, the plug is so often tightly wedged that even the feeder mechanism operable to feed crop material into the feeder duct cannot be reversed in order to help remove the plug of crop material.

SUMMARY OF THE INVENTION

It is an object of the present invention to provide a square baler which is less prone to plugging.

According to the present invention there is provided an agricultural baler including a bale case having an inlet opening formed therein, a feeder duct communicating at one end with the inlet opening in the bale case, and rotary feeder means operable to feed crop material into the feeder duct to form a wad of crop material for subsequent transfer to the bale case. An improvement comprises a wall of the feeder duct being provided with movable means operable to assist in the movement of crop material within the feeder duct and contactable by the crop material as it passes through the feeder duct, whereby the frictional forces produced by the passage of the crop material over that wall of the feeder duct are reduced.

The movable means may be in the form of one or more freely rotatable rollers which rotate when contacted by the crop material. However, preferably the or each roller is driven and conveniently, the peripheral speed of the or each roller is arranged to be substantially equal to the linear speed of the crop material through the feeder duct which basically is determined by the feeder means operable to feed crop material through the feeder duct.

In one embodiment of the invention, four rollers are provided in a feeder duct for a bottom fed bale case, which duct extends through approximately 90° from its inlet to the bale case. The four rollers are disposed in the outer or bottom wall of the duct over the knee or bend in the duct. Each roller may have a smooth peripheral surface or that surface may be provided with depressions and/or extensions (such as raised or depressed dimples, for example) in order that the roller acts more aggressively on the crop material and thus assists the flow thereof through the feeder duct. A combination of smooth and more aggressive rollers may be employed. The portions of the rollers contactable by the crop material will be seen to be movable generally in the direction of flow of crop material through the feeder duct.

The movable means may be in the form of a floor conveyor, such as an apron conveyor or chain and slat conveyor, for example, and whatever its form, is preferably made releasable in order that ready access to the feeder duct can be gained.

It will be appreciated that the provision of movable means in a wall of the feeder duct reduces the frictional forces between the crop material and that wall, whereby the likelihood of the crop material plugging the feeder duct is significantly reduced, if not eliminated.

DESCRIPTION OF THE DRAWINGS

An agricultural baler in accordance with the present invention will now be described in greater detail, by way of example, with reference to the accompanying drawings, in which.

DESCRIPTION OF THE PREFERRED EMBODIMENT

In the following description, right hand and left hand references are determined by standing at the rear of the machine and facing in a direction of forward travel. It is to be understood that such terms as "forward", "rearward", "left", "right", "upwardly", etc. are words of convenience and are not to be construed as limiting terms.

Figure 1:
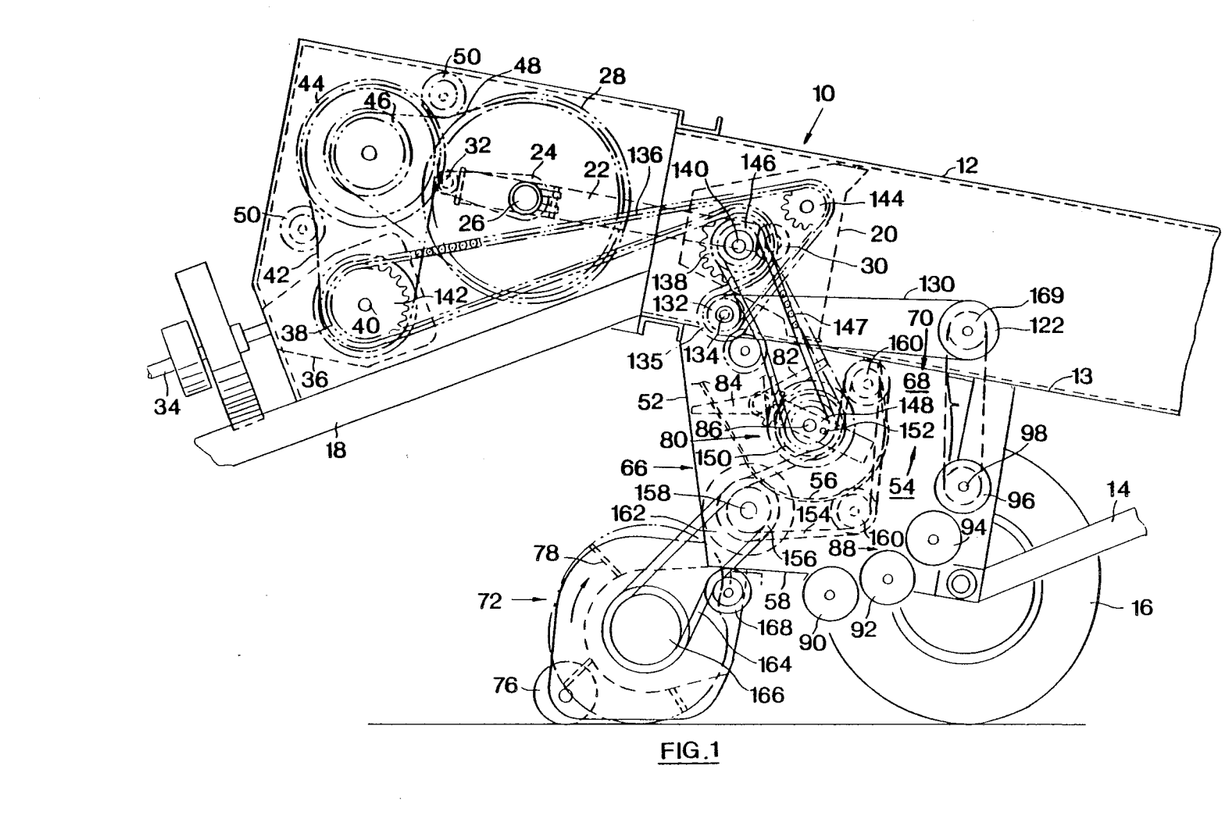
FIG. 1 is a diagrammatic side view of the baler according to the present invention.

Referring to FIG. 1, a baler 10 according to the present invention is shown including a bale case 12 mounted on a frame 14 which is supported by wheels 16. A tongue 18 extends forwardly from the bale case 12 for attachment to a tractor (not shown). A plunger 20 is reciprocally disposed in the bale case 12 to form crop material into rectangular bales. The plunger 20 is attached by a connecting rod 22 to a crank arm 24 fixed to a shaft 26 on which a sprocket 28 is fixedly mounted. The connecting rod 22 has a pivotal connection 30 at one end with the plunger 20 and another pivotal connection 32 at the other end with the crank arm 24.

A drive shaft 34 is connected at one end to a gearbox 36 carried on the baler 10 and is adapted for connection at the other end to the PTO of a tractor (not shown). The drive shaft 34 causes clockwise rotation, as viewed in FIG. 1, of a sprocket 38 which is fixed to the output shaft 40 of the gearbox 36. The sprocket 38 is connected via a chain 42 to a sprocket 44 of larger diameter. A sprocket 46 is fixed to rotate with the sprocket 44. This arrangement of sprockets provides a speed reduction from the sprocket 38 to the sprocket 46. A chain 48 connects the sprocket 46 to the sprocket 28 to cause clockwise rotation of the sprocket 28, as viewed in FIG. 1, in order to cause reciprocation of the plunger 20 in a fore-and-aft direction in the bale case 12. Idlers 50 are provided to maintain proper tension in the chains 42 and 48.

A feed chamber 52 is mounted underneath the bale case 12 and includes a curved duct 54 having top and bottom walls 56 and 58, respectively, and side walls. The top wall 56 is formed of a series of generally U-shaped members which are so arranged side-by-side that slots are provided between adjacent members. The bottom wall 58 is formed primarily of a single curved, continuous panel member and the curved duct 54 extends through approximately 90° and is open at its lower end 66 and at its upper end 68, the upper end communicating with an inlet opening 70 formed in the bottom wall 13 of the bale case 12. A crop pick-up device 72 of a conventional type is pivotally connected at 158 to the feed chamber 52 and is supported by ground wheels 76. The pick-up device 72 includes a plurality of fingers 78 which are rotatable in the direction indicated in FIG. 1 for lifting crop material from the ground and delivering it towards the feed chamber 52.

A feeder mechanism 80 is provided in the feed chamber 52 for moving crop material towards the lower end 66 of the duct 54, then through the duct 54 from its lower end 66 to its upper end 68, and then into the bale case 12 through the inlet opening 70 in the bottom wall 13 thereof. Augers, not shown, are operable to move crop material from the outer regions of the feed chamber 52 inwardly towards the lower and inlet end 66 of the feeder duct 54.

Figure 2:
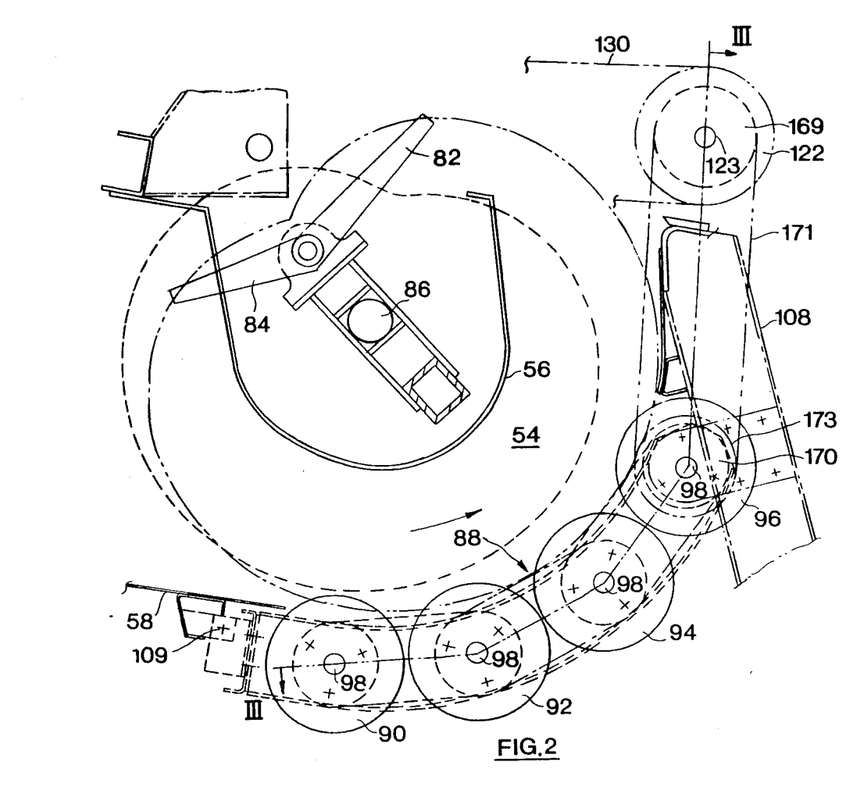
FIG. 2 is an enlarged view of a portion of FIG. 1, with certain parts removed.

The feeder mechanism 80 also includes two sets of feeder elements or tines 82, 84 fixed to a shaft 86, as best seen in FIG. 2, with the tines 82, 84 arranged to project through the slots in the top wall 56 of the duct 54. The tines 82 are longer than the tines 84. Only the tines 82, and not the tines 84, will pass through slots formed in the bale plunger 20 and through slots formed in the bottom wall 13 of the bale case 12.

The baler thus far described is of known form and is disclosed in U.S. Pat. No. 4,525,991 granted Jul. 2, 1985, to A. Naaktgeboren which disclosure is hereby incorporated by reference and which will provide details of the machine which are not directly associated with the present invention.

Figure 3:
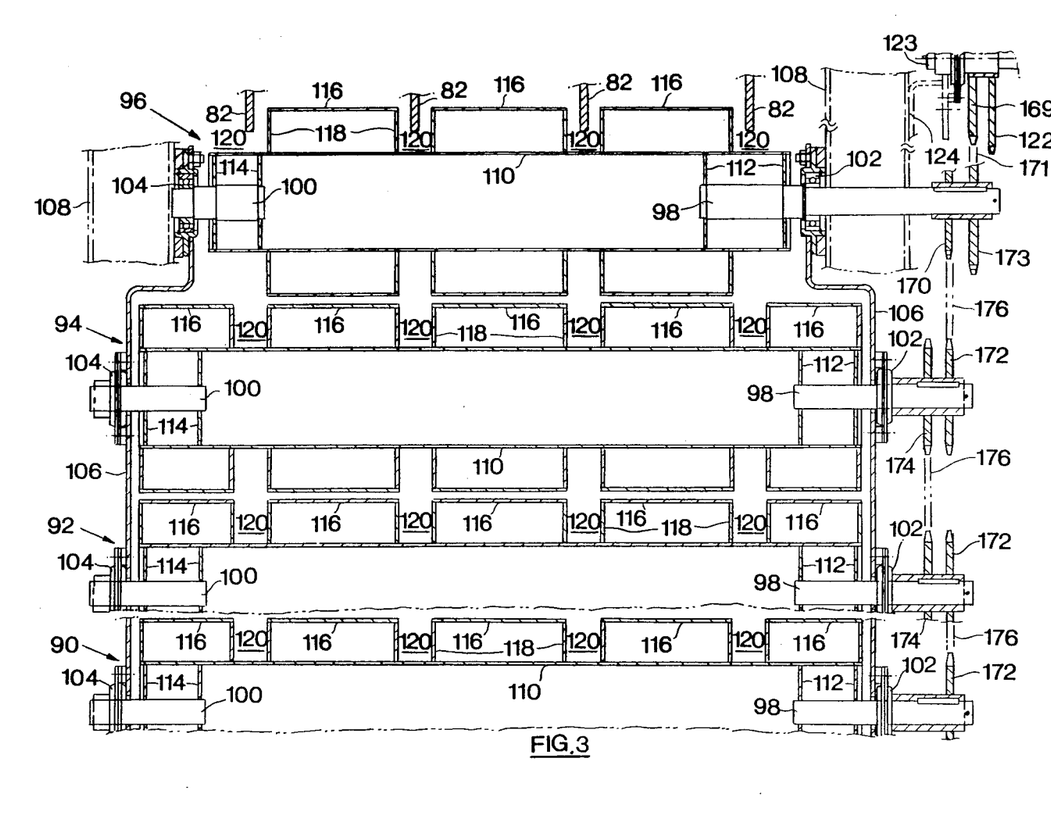
FIG. 3 is a section on the line III—III of FIG. 2, with certain parts curtailed.
Figure 4:
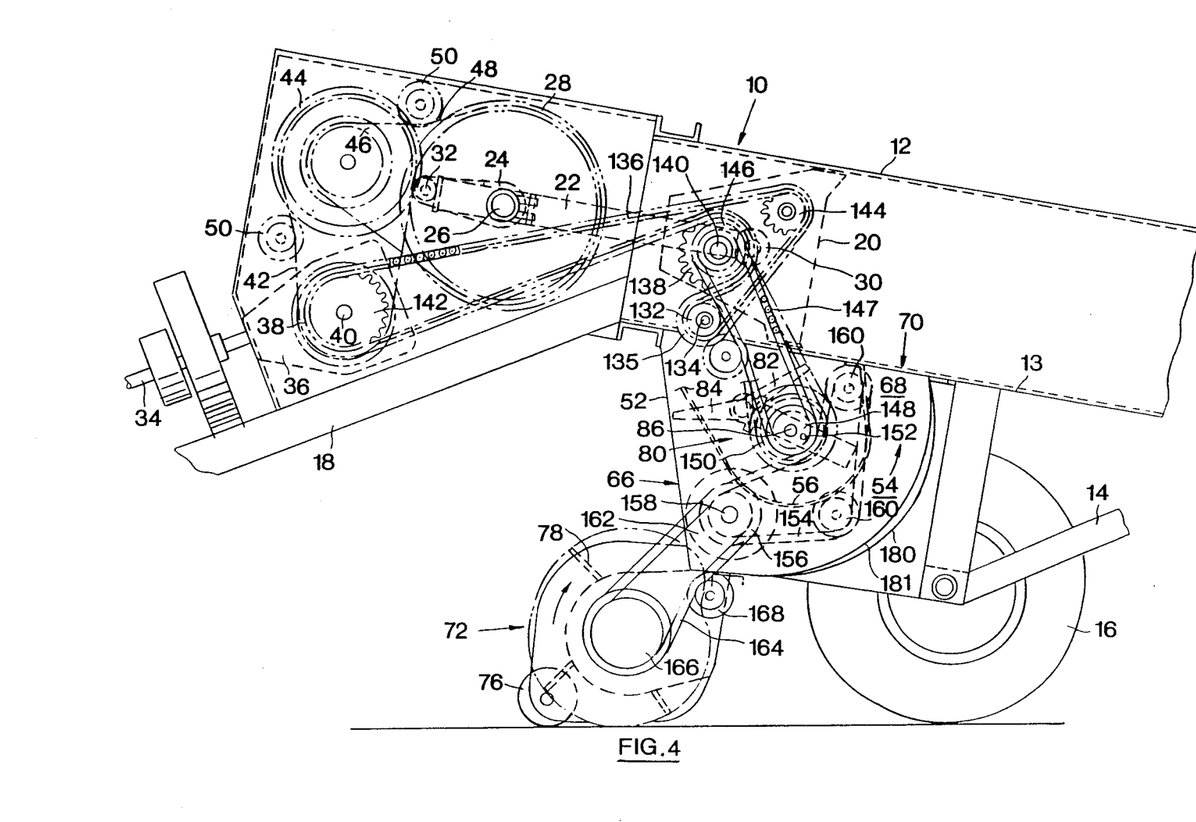
FIG. 4 is a diagrammatic side view of the baler according to another related invention.

As is best seen in FIG. 2 of the drawings, the lower wall 58 of the feeder duct 54 is provided with a central opening 88 which is fitted with movable means in the form of four driven rollers 90, 92, 94 and 96. Referring more specifically to FIG. 3, the rollers 92-96 each comprise a pair of stub shafts 98, 100 mounted for rotation in respective bearings 102, 104 attached to respective arms 106 pivotally attached at one end to the frame 108 of the baler by the stub shafts of the upper roller 96. The arms are releasably securable in the operative position by bolts or other means at the distal end as indicated at 109 in FIG. 2. It will be noted that the uppermost roller 96 is shorter than the other three, with the arms 106 correspondingly cranked, and this is merely because of restricted space in the baler to which the invention is shown fitted. Each roller 90-96 further comprises a cylindrical core 110 mounted between the stub shafts 106, 108 by pairs of annular discs 112, 114. The actual periphery of each roller 90-96 is discontinuous in the axial direction in the sense of having a plurality of peripheral sections 116 attached by side flanges 118 to the core 110, these sections being axially spaced apart along the roller. The rollers 90 to 94 have five such peripheral sections 116, with the shorter and uppermost roller having three such sections. The rollers 90-96 are made discontinuous along their length in order to create gaps 120 to accommodate the longer tines 82 of the feeder mechanism 80, which tines effect stuffing of a wad of crop material accumulated in the feeder duct 54 into the bale case 12. This stuffing action is maximised if the stuffer tines 82 "enter" the periphery of the rollers 90-96 but this feature is not essential.

It will be seen that the rollers 90-96 are disposed at the knee of the outer or bottom wall 58 of the feeder duct 54 and are relatively closely spaced in order to ensure a positive handing over of the crop material from one roller to the next. In this regard, the peripheral surface of each peripheral section 116 of the rollers is smooth but some or all of the rollers may be provided with indentations and/or extensions, for example in the form of dimples or pips, in order to act more aggressively on the crop material.

One roller is arranged to drive the adjacent roller, with the uppermost roller 96 being driven from a drive train comprising a sprocket 122 mounted for rotation on a shaft 123 supported on a bracket 124 on the frame 108 of the baler. A chain 130 extends around the sprocket 122 to a sprocket 132 mounted on a shaft 134 which carries a second sprocket 135 driven by a chain 136 which extends around a sprocket 138 mounted on a shaft 140, a sprocket 142 mounted on the output shaft 40 of the gearbox 36, and an idler sprocket 144. A further sprocket 146 on the shaft 140 drives, via a chain 147, a sprocket 148 freely rotatably mounted on the shaft 86 of the feeder mechanism 80. A pulley 150 is keyed to the shaft 86 and the sprocket 148, respectively the pulley 150 are interconnected by a shear bolt 152.

A belt 154 extends around the pulley 150, a pulley 156 on a shaft 158 and two idler pulleys 160. A second pulley 162 is attached to the shaft 158 and a belt 164 extends around that pulley and around a pulley 166 mounted on a shaft of the pick-up device 72, and an idler pulley 168. Thus the pick-up device 72, the feeder mechanism 80 and the augers (mounted on the shaft 158) are all driven from output shaft 40 of the gearbox 36. However, it will be noted that only the drive to the feeder mechanism 80, the augers and the pick-up device 72 will be interrupted if the shear bolt 152 fails, even though the sprocket 148 will be continuously driven, because the drive to the rollers 90, 96 is independent and continuous. It will be seen that the continuous drive to the rollers 90–96 is affected by the uppermost roller 96 being driven by a second sprocket 169 on the shaft 123 via a chain 171 extending around a first sprocket 173 on the stub shaft 98 of the uppermost roller 96. A second sprocket 170 on this stub shaft 98 drives the adjacent roller 94 and so on. The stub shaft 98 of the rollers 92 and 94 are each provided with a pair of sprockets 172, 174 and the roller 90 with a single sprocket 172, all of the same diameter as the sprocket 170 associated with the roller 96 so that the outer peripheral speed of each roller equals the linear speed of the feeder tines 82, 84. Chains 176 interconnect the sprockets 170 and 172 of the respective rollers 96 and 94, the respective sprockets 174 of the rollers 92 and 94 and the respective sprockets 172 of the rollers 90 and 92.

The feeder duct bottom wall portion formed by the arms 106 interconnected by the rolls 90–96 are releasably mounted on the frame 108 so that access to the feeder duct 54 through the opening 88 can readily be gained to service certain components such as the knives (not shown) on the baler plunger 20 and on the bale case 12. The arms 106 may be moved by hydraulic or pneumatic ram means (not shown), or by other means, between the operative and the inoperative or released positions.

The basic operation of the baler is as described in U.S. Pat. No. 4,525,991 with the tines 84 serving to feed crop material delivered by the augers from the pick-up device 72 into the feeder duct 54, and the tines 82 serving to stuff an accumulated wad of crop material into the bale case 12. The driven rollers 90–96 reduce the frictional forces between the crop material and the bottom wall 58 of the feeder duct 54 to such a level that plugging of crop material, even silage, is virtually eliminated. In the rare event of plugging occurring, it is possible to reverse the independent drive to the rollers 90–96 and if this fails, to reverse also the drive to the feeder mechanism, once the failed shear bolt 152 has been replaced, in order to dislodge the plug of material and discharge it through the feeder duct inlet 66. This is possible because again, the frictional forces between the plug of material and the bottom wall 58 of the feeder duct 54 are much reduced by the rollers so that drive reversal of the feeder mechanism 80 will be effective which would not be possible without the rollers because in prior art balers, the feeder mechanism locks up on plugging.

The shear bolt arrangement between the sprocket 148 and the pulley 150 is provided not in the expectation of plugging occurring but as a precaution against the presence of a large piece of wood, metal or stone, for example, in the crop material picked up by the pick-up device 72. In such an event, the foreign object is likely to become jammed in the feeder duct 54 and thus impede the operation of the feeder mechanism, whereby the shear bolt 152 will fail. However, should plugging occur, and the reversal of the feeder mechanism and roller driver fail to clear the plug, the rollers 90–96 or other movable means can be released to allow access through the opening 88 through which the plug may fall on removal of the movable means or upon actuation of the feeder mechanism either in the normal or reverse direction of movement in a similar manner to that described in co-pending Application GB no. 8810064 of even date.

Figure 5:
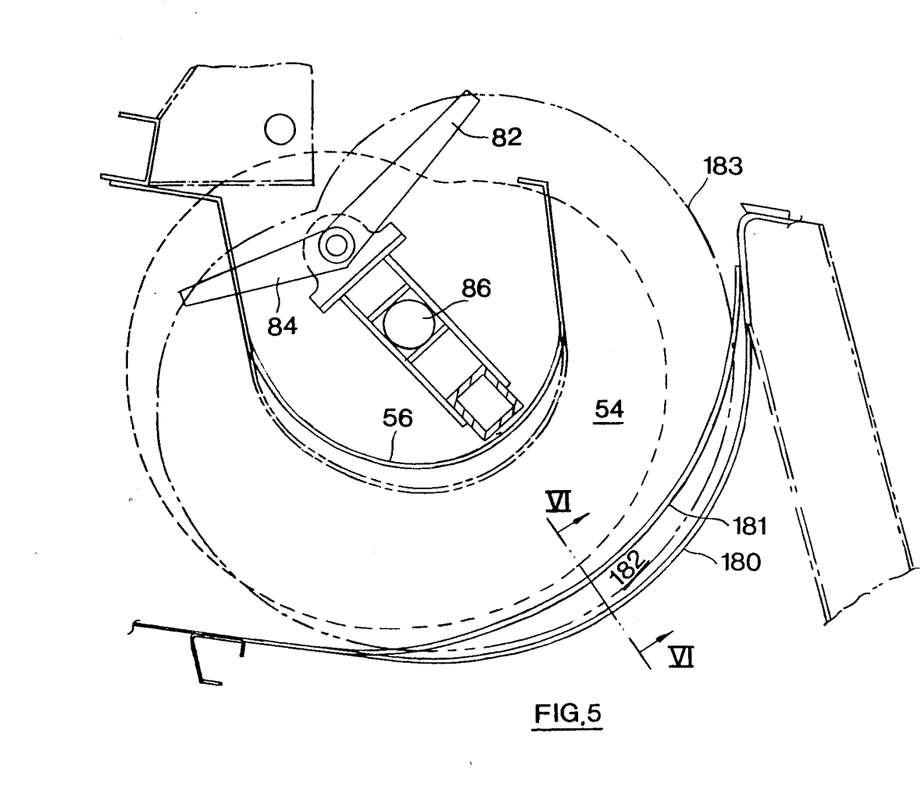
FIG. 5 is an enlarged view of a portion of FIG. 4, with certain parts removed.

Referring now to FIGS. 4 to 7, a baler 10 according to another related invention is shown. It will be seen that most of the components of this baler 10 are indentical to the corresponding components of the baler 10 referred to in FIG. 1 except for the rollers 90, 96 and the drive therefor which have been replaced by a curved, fixedly secured bottom wall element 180 extending from the feeder duct lower end 66 to its upper end 68 through approximately 90°. A further wall 181, formed by a continuous panel member equally curved through approximately 90°, has a radius of curvature R2 which is larger than the radius of curvature R1 of the bottom wall 180. Referring more specifically to FIG. 5, this further wall 181 is provided in the feeder duct 54 inwardly of the bottom wall 180. Due to the difference in radii, both walls 180, 181 tangentially touch at their respective ends near the lower and upper end 66, 68 of the feeder duct, forming a sickle-shaped volume 182 inbetween.

Figure 6:
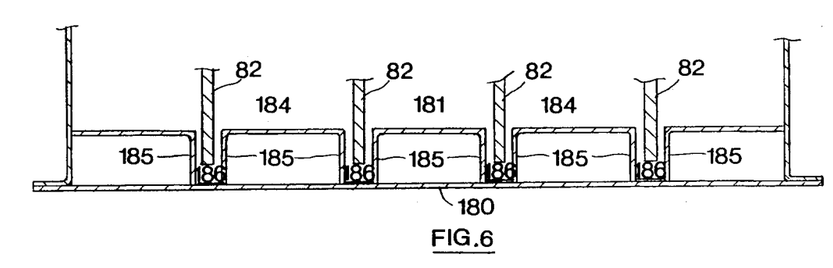
FIG. 6 is a section on the line VI—VI of FIG. 5.

During part of a feeding cycle of the feeder means 80, the paths of the longer stuffer tines 82, shown by the chain line 183, extend into the volume 182. To enable this, and as is best seen in FIG. 6, elongated slots 184 have been provided in the further wall 181, through which the stuffer tines 82 penetrate. As the volume 182 now would be susceptible to accumulation of crop material particles entering through the elongated slots 184, sickle-shaped wall members 185 are vertically fixed between the edges of the elongated slots and the spaced bottom wall 180. As a result, grooves 186 are formed which are closed-off at three sides and are open at the top to allow the penetration of the stuffer tines 82.

During the baling operation of the known baler from which the present invention starts, it has been experienced that plugging of the feeder duct 54 most frequently occurs during the stuffing stroke of the feeder, i.e. when crop material accumulated in the feeder duct 54 has to be transferred from said duct 54 into the bale case 12 through the opening 70 in the bottom wall 13 thereof. Various reasons for this plugging have been found such as, for example, a wedging of crop material between the feeder tine tips 187 and the bottom wall 180. Indeed, during a stuffing stroke of the feeder means 80, the stuffing tines 82 sweep closely along the bottom wall 180 positively to engage all crop material accumulated in the feeder duct 54 for transfer to the bale case 12. However, at the same time, the smooth stuffing operation may be endangered as crop material may tend to wedge in between the stuffer tines 82 and the narrowly spaced bottom wall 180 giving rise to a possible blockage of the feeder means 80. The further wall 181 in the feeder duct 54 now overcomes this problem as will be apparent from the following.

Crop material, such as hay, straw or silage, normally is composed of entangled stems which bridge over the slots 184 in the further wall 181 while being transported in the feeder duct 54, without touching the bottom parts of the grooves 186. Accordingly, in the most critical zone for plugging, being approximately in the middle between the feeder inlet 66 and outlet 68, the tips of the stuffer tines 82 will extend into the grooves 186 through the layer of crop material without participating in the transport. This transport of crop material towards the bale case 12 is now being taken care of solely by the front edges of the tines 82 extending above the further wall 181. As a result, the tendency of crop material getting stuck underneath the tips of the stuffer tines 82 is positively eliminated and hence the risks for plugging of the feeder also is greatly reduced.

It further also will be appreciated that the bottom wall 180 beneath the further wall 181 is necessary only to prevent particles of crop material that nevertheless enter into the grooves 186 from being lost in as much as these particles would fall to the ground if the bottom wall 180 were not provided and thus the grooves 186 were open at their lower ends. The relatively small amounts of small and individual particles of crop material which nevertheless enter into the grooves 186 do not cause any plugging risks as these particles are not likely to wedge inbetween the tips of the tines 82 and the bottom wall 180.

However, the provision of the further wall 181 nevertheless could possibly create a capacity problem in that the cross-sectional area of the feeder duct 54 has been diminished with a dimension equal to the distance inbetween the two walls 180, 181. To overcome this, the original upper wall 56, shown in chain line in FIG. 5, may be shifted upwardly to a position as shown in full lines over a distance necessary to restore said original cross-sectional area.

Figure 7:
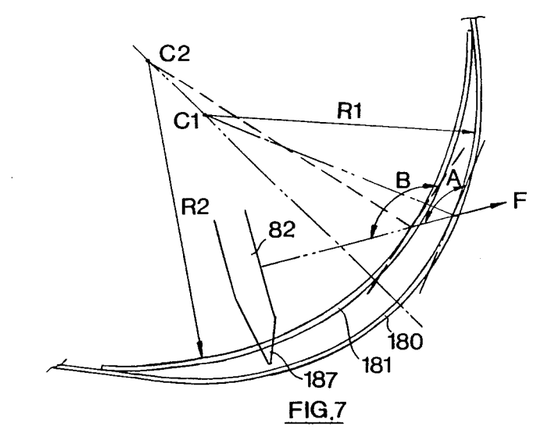
FIG. 7 is a view of a portion of FIG. 5.

Another advantage of the larger radius of curvature R2 of the further bottom wall 181 will now be made clear with reference to FIG. 7, which shows a part of the feeder duct 54 comprising to two walls 180, 181. The curvature of the feeder duct 54 between the vertical inlet opening 66 and the horizontal outlet opening 68 has a great influence on the smooth flow of crop material therethrough. Indeed, the larger the radius of curvature of the feeder duct 54, the easier a wad of material will flow from a generally vertical orientation at the inlet 66 to a generally horizontal orientation at the outlet 68. Accordingly, the further wall 181 with a larger radius R2 than the originally provided bottom wall 180, improves the crop material flow as explained.

The wall 180 forms an arc, the bisector of which contains the center C1 at a distance or radius R1 from said arc. The same applies to the further wall 181 at a radius R2, being actually larges than R1, from its center C2. As both arcs tangentially touch at their respective ends, both bisectors coincide.

An arrow F, perpendicular to the feeder tines 82, represents the total force excerted by the feeder tines 82 on a wad of crop material while stuffing the same into the bale case 12. As most of the crop material is located near the bottom wall of the feeder duct 54, the application point of the force F on the stuffer tines 82 will not be displaced much whether the further wall 181 is provided or not. The force F can be resolved in two components, one perpendicular to the respective walls 180, 181 and one tangential to the same. It will be seen that the arc B between the force F and the tangential to the further wall 181 is larger than the comparable arc A between said force F and the bottom wall 180. Therefore, as a result, the component of the force F perpendicular to the bottom wall 180 will be larger than the comparable component relative to the further wall 181. It will be appreciated that these latter perpendicular components of the force F are responsible for the frictional forces exerted by the crop material on the feeder bottom wall and thus, it also will be appreciated that less friction is to be expected when the further wall 181 is provided. Accordingly, in the latter case, the flow of crop material through the feeder duct is less hesitant, thereby eliminating local compaction of crop material between the tines and the bottom wall and diminishing the chances for a possible obstruction of the feeder means 80 to occur. This, in turn, also results in the fact that also the total force F exerted by the tines 82 on a wad of material, will be smaller in the case where the further wall 181 is installed. Consequently, the overall power consumption of a baler according to this aspect of the present invention is significantly less.

It will be seen that the significant advance in the art afforded by the present invention is that of the virtual elimination of plugging which in prior art balers has been a very real problem, especially when baling silage, and has required considerable labour to rectify due to the general inaccessibility of the feeder duct 54 even if the pick-up mechanism is removed. It is not uncommon for the manual removal of a plug of crop material to take up to several hours in a known baler. Even if plugging does occur in a machine constructed in accordance with one aspect of the present invention, the plug is removed in a matter of minutes by drive reversal and/or releasing the movable means as described.

As already mentioned, the rollers 90-96 of the first described embodiment may be replaced by a form of moving floor, for example, such as an apron or slat conveyor, and if rollers are employed they need not be driven and may number from one upwards. As a generality, it is more important to have the movable means operable in the more generally vertical portion of the bottom wall 58 of the feeder duct 54 when such a wall is present because crop material tends to be forced against this wall as opposed to along it.

Although the overall power consumption of a baler in accordance with the first described invention may not be significantly less than in a comparably sized known baler, the power is better utilised in virtually preventing plugging.

As already indicated above, a baler in accordance with the second invention may be provided with only one bottom wall replacing the set of walls 180, 181 on condition that recesses are provided therein to accomodate the passage of the stuffer tines 82 therethrough. The further wall 181 may be spaced still further from the bottom wall 180, whereby also the paths of the packer tines 84 may extend through the slots or recesses therein. The further wall 181 may be provided concentrically inwardly of the bottom wall 180, taking only advantage of the penetrating feeder tines 82, 84 without applying the larger radius of curvature of the feeder duct 54.

What is claimed is:

1. In an agricultural baler including a bale case having an inlet opening formed in a bottom wall thereof, a feeder duct communicating at one end with the inlet opening in the bale case, and feeder means operable to feed crop material into the feeder duct to form a wad of crop material for subsequent transfer to the bale case; an improvement comprising a lower wall of the feeder duct being provided with movable means operable to assist in the movement of crop material within the feeder duct and contactable by the crop material as it passes through the feeder duct, whereby the frictional forces produced by the passage of the crop material over said lower wall of the feeder duct are reduced, said movable means including a plurality of rollers extending transversely of the feeder duct and arranged side-by-side along the lower wall of the feeder duct.

2. In a baler according to claim 1, further comprising means for driving said rollers.

3. In a baler according to claim 2, wherein said rollers each have an outer peripheral surface, and said feeder means include a plurality of tines with outer tips movable through the feeder duct at a predetermined speed.

4. In a baler according to claim 3, wherein the outer peripheral surface of each of said rollers is driven at a speed that is substantially equal to the predetermined speed of said outer tips of said tines.

5. In a baler according to claim 3, wherein said rollers have gaps formed therein for receiving the outer tips of said tines as they move through the feeder duct.

6. In a baler according to claim 1, further including a pickup disposed adjacent the other end of the feeder duct.

7. In a baler according to claim 6, wherein said lower wall of said feeder duct is curved upwardly and rearwardly from the pickup to the bale case, and said rollers are disposed in an arcuate arrangement adjacent a middle portion of said lower wall.

* * * * *